(12) United States Patent
Collins

(10) Patent No.: US 7,039,361 B1
(45) Date of Patent: May 2, 2006

(54) SYSTEM AND METHOD FOR REDUCING ELECTROMAGNETIC INTERFERENCE

(75) Inventor: Jeffrey J. Collins, Fairfield, CA (US)

(73) Assignee: CIENA Corporation, Linthicum, MD (US)

( * ) Notice: Subject to any disclaimer, the term of this patent is extended or adjusted under 35 U.S.C. 154(b) by 564 days.

(21) Appl. No.: 10/062,113

(22) Filed: Feb. 1, 2002

(51) Int. Cl.
*H04B 1/00* (2006.01)
*H04B 15/00* (2006.01)

(52) U.S. Cl. ............... 455/63.1; 455/67.13; 455/114.2; 455/67.11; 455/501; 428/304.4; 174/35 R; 174/35 GC; 439/607

(58) Field of Classification Search ............... 455/501, 455/63.1, 67.11, 67.13, 114.2; 428/304.4; 174/35 R, 35 GC; 439/607
See application file for complete search history.

(56) References Cited

U.S. PATENT DOCUMENTS

| | | | | |
|---|---|---|---|---|
| 4,931,479 A | * | 6/1990 | Morgan | 521/76 |
| 4,948,922 A | * | 8/1990 | Varadan et al. | 174/35 GC |
| 5,763,824 A | * | 6/1998 | King et al. | 174/35 R |
| 5,855,818 A | * | 1/1999 | Gan et al. | 252/511 |
| 5,869,412 A | * | 2/1999 | Yenni et al. | 442/376 |
| 5,910,524 A | * | 6/1999 | Kalinoski | 523/215 |
| 6,113,425 A | * | 9/2000 | Yee | 439/607 |
| 6,210,789 B1 | * | 4/2001 | Hanrahan | 428/324 |
| 6,214,260 B1 | * | 4/2001 | Bessette et al. | 252/511 |
| 6,252,159 B1 | * | 6/2001 | Anagnos | 174/35 MS |
| 6,309,742 B1 | * | 10/2001 | Clupper et al. | 428/304.4 |
| 6,324,075 B1 | * | 11/2001 | Unrein et al. | 361/816 |
| 6,390,475 B1 | * | 5/2002 | Eckblad et al. | 277/312 |
| 6,395,402 B1 | * | 5/2002 | Lambert et al. | 428/550 |
| 6,410,847 B1 | * | 6/2002 | Allen et al. | 174/35 MS |
| 6,507,101 B1 | * | 1/2003 | Morris | 257/706 |
| 6,542,371 B1 | * | 4/2003 | Webb | 361/708 |
| 6,600,647 B1 | * | 7/2003 | Girvin et al. | 361/682 |
| 6,646,199 B1 | * | 11/2003 | Botrie | 174/35 GC |
| 6,670,545 B1 | * | 12/2003 | Botrie | 174/35 GC |
| 2003/0116830 A1 | * | 6/2003 | Haines | 257/659 |

* cited by examiner

*Primary Examiner*—Stephen D'Agosta
(74) *Attorney, Agent, or Firm*—Dougherty I Clements; Christopher L. Bernard; Tyler S. Brown

(57) ABSTRACT

A method and system for reducing electromagnetic interference emanating from and existing within a network device is provided. A layer of foam having a high insertion loss in the range of electromagnetic interference generated by the network device is provided on at least a portion of an inner surface of the telecommunication device. Electromagnetic interference generated by the components of the device is at least partially absorbed by the foam. The foam may be applied to the inner surface of the chassis of the device, or it may be applied on or near a high speed integrated circuit chip, or both.

13 Claims, 5 Drawing Sheets

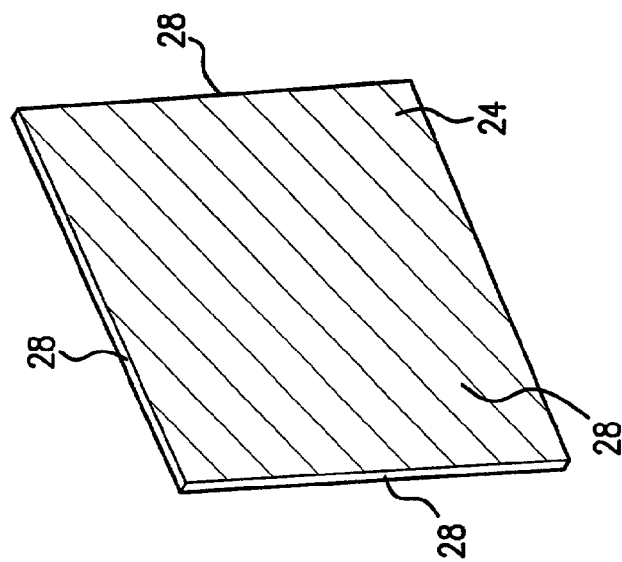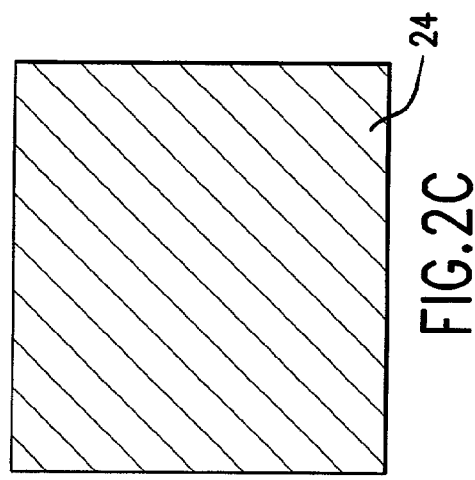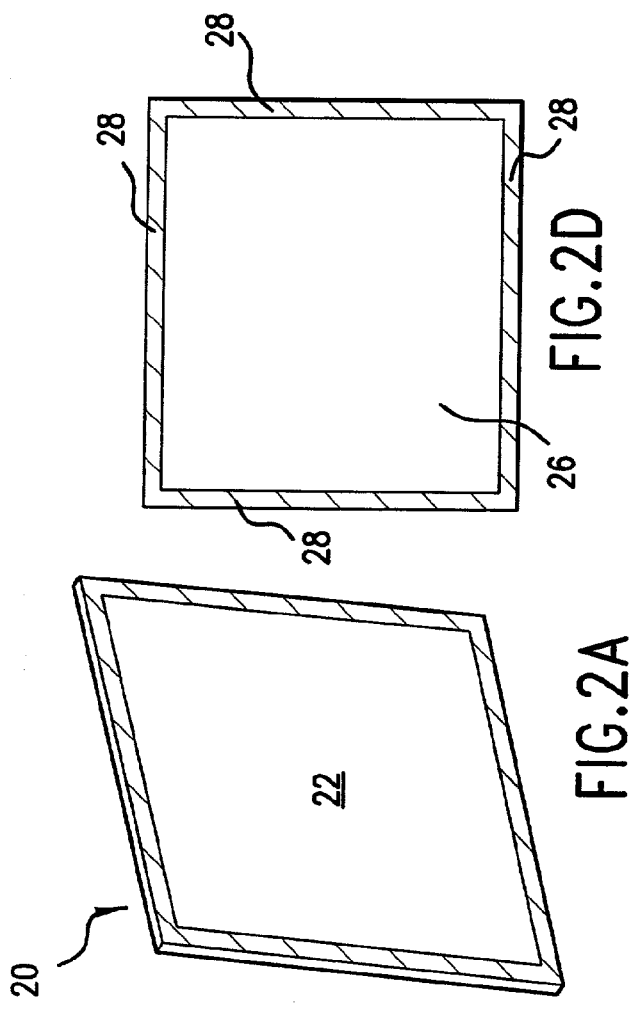

SYSTEM AND METHOD FOR REDUCING ELECTROMAGNETIC INTERFERENCE

BACKGROUND OF THE INVENTION

1. Field of the Invention

The invention relates to electromagnetic interference reduction. More specifically, the invention relates to a system and method for reducing the internal and external effects of electromagnetic interference generated by network devices and devices operating in the same or similar frequency ranges.

2. Description of Related Art

Telecommunications and data networks employ devices which act as nodes within the network that route, switch, or otherwise manage the various signals being sent along multiple optical fibers and other types of lines. As the need for faster and greater data transfer increases, so does the complexity of these networks as well as the network devices therein.

These network devices, like most electronic devices, are subject to the regulations of the Federal Communications Commission (FCC) and other organizations worldwide because they generate radio frequency (RF) signals in the form of electromagnetic interference (EMI). In many other conventional electronic devices (including prior conventional telecommunications devices), shielding was provided to retain the RF interference within the cabinet or housing of the device. In such an arrangement, one or more of the components of the device generates a stray RF signal as interference, and the interference strikes and bounces off the shielding and is trapped inside the housing. This shielding can be in the form of metal gaskets that line the perimeter of the housing, or can take the form of a sealed metal box-like structure known as a Faraday cage. In some network devices, the electronic components of the device are arranged on cards called line modules which are stacked or hung either vertically or horizontally in a chassis or cabinet. The backs of the line modules may be provided with a plate of metal which can act as a shield against RF interference. Since a given line module has its own metal plate and it faces the back of an adjacent line module, stray RF signals have heretofore been relatively contained.

The conventional shielding approach, however, is not practical for use with modern network devices which process signals at extremely high frequencies and in high density (such as, for example, the Core Director™ switch made by CIENA Corporation), for several reasons. First, it is impractical to seal the cabinet or housing of such a device, because routine, hot-swappable maintenance of the components requires frequent entry into the housing. Providing a seal that would reseal perfectly after every opening of the housing would be difficult and impractical.

Second, even if a seal were provided for modern network devices, it would need to be extremely tight. The clock speed of some of the components of a such networking devices are in the range of 1–40 GHz (e.g., serializing/deserializing chips or SERDEs). Because the speed of the components is so high, the frequency of the resulting RF interference is equally high, and the wavelength of the interference is extremely small. With such a small wavelength of interference, the shielding would need to be extremely tight, otherwise the RF interference would escape from the smallest of gaps or holes in the shielding.

Finally, even assuming such a tight, resealable shielding were practical and effective to prevent the device from emitting 1–10 GHz RF interference, the shielding would simply reflect the interference back into the housing of the network device as it would in a conventional RF shielding application. In this case, however, the reflected EMI noise would impede the functioning of the device (or, at very least, slow the device down to an unacceptable level). That is, the use of effective shielding would cause the network device to interfere with itself.

Thus, as network devices have become faster and more complex, traditional RF shielding techniques have become less and less relevant and effective. In the case of state of the art optical network devices such as the Core Director™ switch, RF shielding is not a complete solution. Another means or method of dealing with the RF noise generated by these extremely high speed devices—particularly in the 1–10 GHz range—needed to be developed. In addition, network devices must conform to the Network Equipment Building System (NEBS) standards limiting the overall size or "footprint" of the device. Thus, any modifications to a network device could not increase its footprint.

SUMMARY OF THE INVENTION

The invention includes a method and system for reducing electromagnetic interference emanating from and existing within a network device or similar devices by absorbing the RF interference rather than merely reflecting it. A layer of foam having a high insertion loss in the range of electromagnetic interference generated by the network device is provided on at least a portion of an inner surface of the network device. At least some of the electromagnetic RF interference generated by the components of the device is absorbed by the foam. The foam may be applied to the inner surface of the chassis of the device, or it may be applied directly to or near a high speed integrated circuit chip, or both.

In one embodiment, the foam is preferably provided at least on a portion of a door of the chassis of the network device. In addition or instead, the foam may be provided at least on top of an integrated circuit of the network device, right at the source of the RF emissions. As another alternative, the foam may be applied to a heat sink which is, in turn, disposed on the integrated circuit which generates the stray RF signals. When used in such a network device, the layer of foam is preferably approximately 0.25 inches in thickness and is preferably specially doped to have a high insertion loss (i.e., ability to absorb RF signals) in the range of 1–10 GHz.

BRIEF DESCRIPTION OF THE DRAWINGS

FIG. 2a is a rear perspective view of the sheet of EMI foam according to an embodiment of the invention.

FIG. 2b is a front perspective view of a sheet of EMI foam of FIG. 2a.

FIG. 2c is a front plan view of a sheet of EMI foam of FIG. 2a.

FIG. 2d is a rear plan view of a sheet of EMI foam of FIG. 2a.

DETAILED DESCRIPTION OF THE EMBODIMENTS

As described briefly above, embodiments of the invention include a method and system for reducing electromagnetic interference emanating from and existing within a network device or similar devices by absorbing the RF interference with a layer of RF-absorbing foam, also known as EMI (electromagnetic interference) foam. Materials exist which can absorb RF signals and convert them into thermal energy, although network device suppliers have never though of designing or implementing such materials within or near the housings of network devices, and none has ever successfully absorbed sufficient RF energy in the relevant range of 1–10 GHz. For example, anechoic chambers—used to perform electromagnetic compatibility (EMC) testing—are rooms having walls typically covered with either ferrite tiles or bulky carbon foam in an "eggcrate" configuration (i.e., densely packed cones rising from a relatively flat base). These materials would not be practical in the confines of a network device cabinet. In the first place, they do not adequately absorb RF interference in the 1–10 GHz range and also fall short of 1 GHz. Secondly, they are either too heavy (in the case of the ferrite tile) or too bulky (in the case of the carbon foam) to be usable on, for example, the door of a network device, such as a CoreDirector switch. To remain in compliance with NEBS and other industry standards, network devices do not have large clearances between their doors and their components.

In accordance with an embodiment of the invention, carbon foam can be created to provide a high insertion loss in the RF range above 1 GHz in order to be used in such high performance network device applications. In particular, the foam can be doped (e.g., with more carbon) to be particularly absorptive in the range of 1–10 GHz and further be of a certain small thickness. In one embodiment, a flat, carbon filled, flexible foam sheet, such as Cuming Corporation's C-RAM MT product can be doped to attain a desired insertion loss (ability to absorb RF signals) in the range of 1–10 GHz and at a desired thickness, such as 0.25 inches.

Description of a preferred embodiment of the invention will now be given with reference to the exemplary FIGS. 1–6 attached hereto. It should be realized that these drawings in no way limit the scope of the invention, which is defined by the claims appearing hereinbelow.

Figure 1:
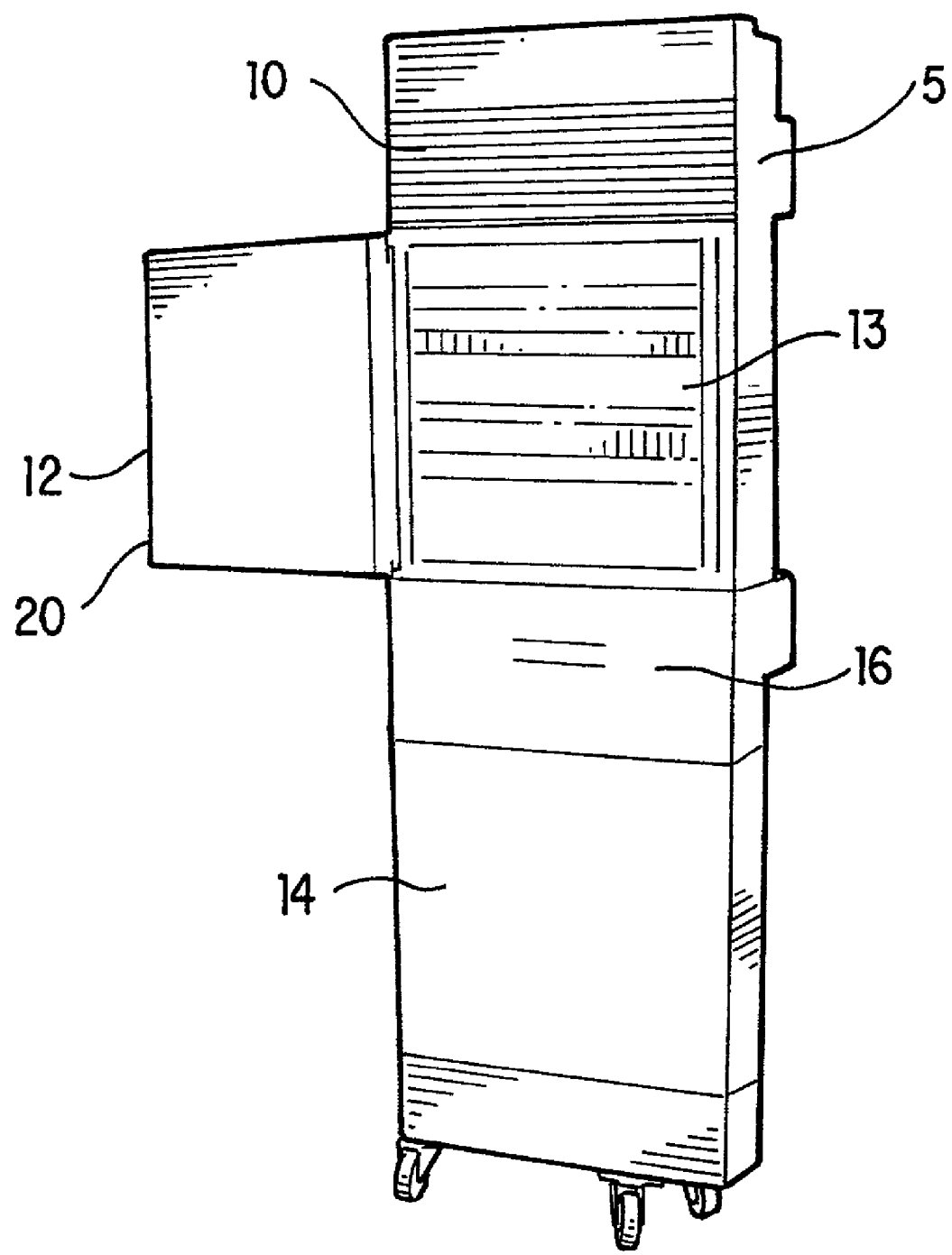
FIG. 1 is a perspective drawing showing a network device utilizing one embodiment of the invention.

FIG. 1 depicts a network device 5, in this example, a CoreDirector™ switch by CIENA Corporation. Device 5 includes a chassis or cabinet 10 which has an openable bay door 12 and another bay door 14. Within the chassis is disposed some support structure (not shown) such as shelving, hooks, etc., for supporting a series of circuit boards such as line modules 13. Line modules 13 are shown behind open bay door 12; additional line modules or other RF interference-generating components such as switching modules or control modules may also be disposed behind bay doors 14 and 16.

As described above, at least some of the components of line modules 13 emit RF interference, which is absorbed in an embodiment of the invention, so that it does not interfere with the proper functioning of device 5. As shown in FIG. 1, an embodiment of the invention includes the method of applying a thin sheet of doped, carbon-filled foam 20 to an inner surface of chassis 10, preferably on the inner surface of bay doors 12 and/or 14 and 16. Foam 20 is specifically altered from the general commercial state, e.g., as Cuming Corporation's C-RAM MT-30, by carbon doping, for example, to have a much greater insertion loss over the relevant range of 1–10 GHz.

Figure 3:
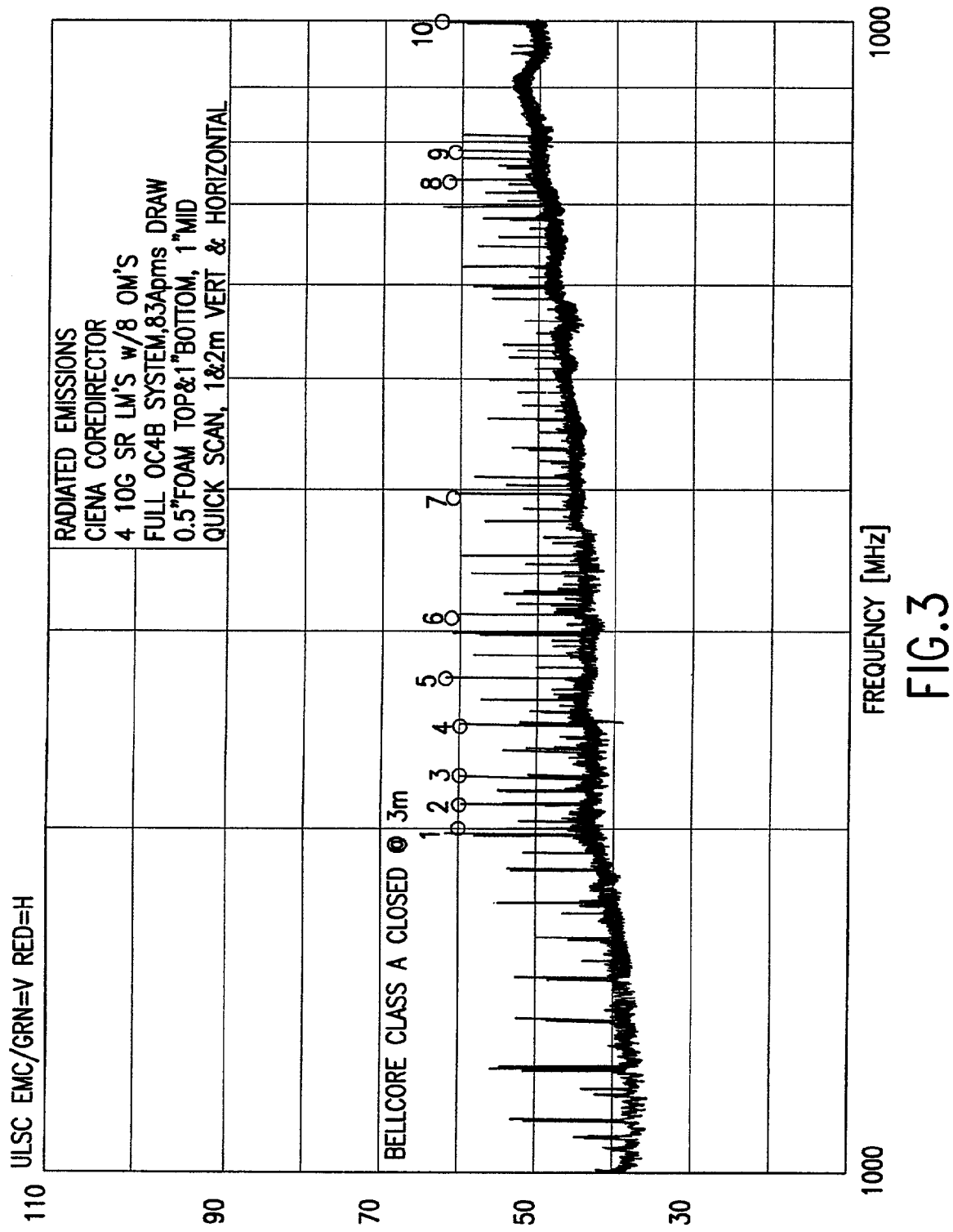
FIG. 3 is a graph illustrating the amount of RF signal detected outside a network device having a one-half inch thick section of conventional EMI foam product.

FIG. 3 is a graph illustrating how much RF interference escapes from a CIENA CoreDirector switch when a conventional 0.50 inch thick sheet of foam is disposed on the door of the cabinet. As shown in the graph, the Bellcore Class A industry standard for RF interference is exceeded in a substantial number of frequencies. As such, the conventional foam product would be an unsuitable solution for the instant problem.

Figure 4:
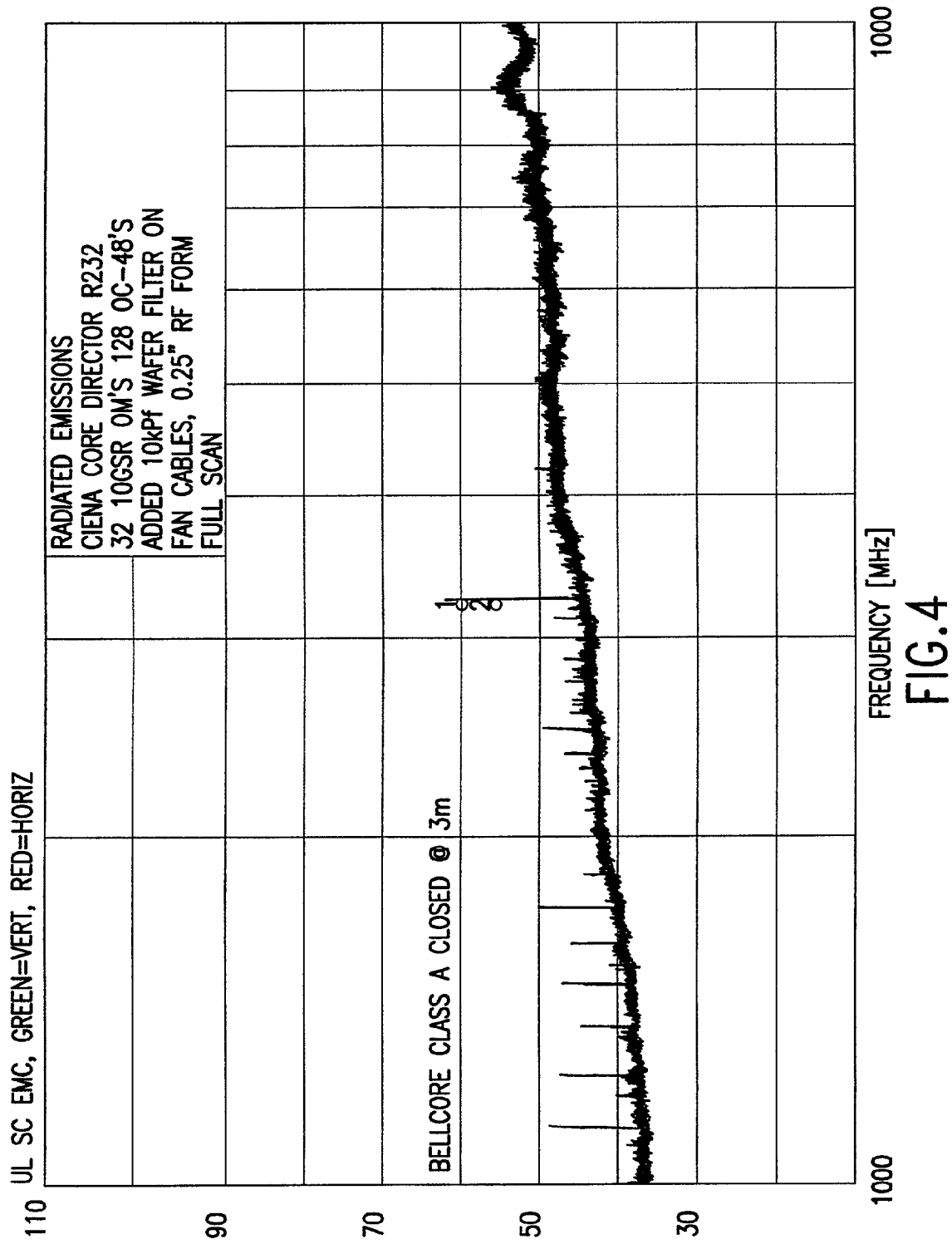
FIG. 4 is a graph illustrating the amount of RF signal detected outside a network device having a one-quarter-inch thick section of doped EMI foam of an embodiment of the present invention.

By contrast, FIG. 4 illustrates how much RF interference escapes from a CIENA CoreDirector switch when a 0.25 inch-thick sheet of the carbon doped foam is disposed on the door of the cabinet. The doped foam prevents RF interference from exceeding the Bellcore Class A standard at all frequencies, as shown in the graph. FIG. 4 illustrates that the inventive method need not completely eliminate all RF interference, so long as the RF interference that does escape the network device is below a certain threshold.

FIGS. 2a–d depict various views of an embodiment of the foam sheet 20. On the rear main surface 22 of foam sheet 20, an adhesive 26 is provided to allow foam 20 to be secured easily to doors 12, 14, 16. Adhesive 26, preferably a pressure sensitive acrylic, is provided with a backing (not shown) so that the adhesive remains protected prior to installation of foam 20. On front main surface 24, a cover material 28 is wrapped to protect foam 20 from damage caused by the environment, abrasion, or the like. Cover 28 is preferably made from a nylon fabric sealed with polychloroprene elastomeric binder. As shown in FIGS. 2a and d, cover 28 is preferably wrapped around the edges of foam sheet 20 to protect the edges as well as front main surface 24.

Foam sheet 20 must be thin enough to be accommodate the small gap between the closed bay door 12 and line modules 13. Consequently, the additional doping process in the 1–10 GHz range causes the insertion loss to increase by at least 10 dB over approximately 0.25 inches of foam 20 as compared to the conventional C-RAM MT-30. As a result, the foam 20 at this thickness exhibits sufficient insertion loss to be able to be used in chassis 10 of network device 5.

Figure 5:
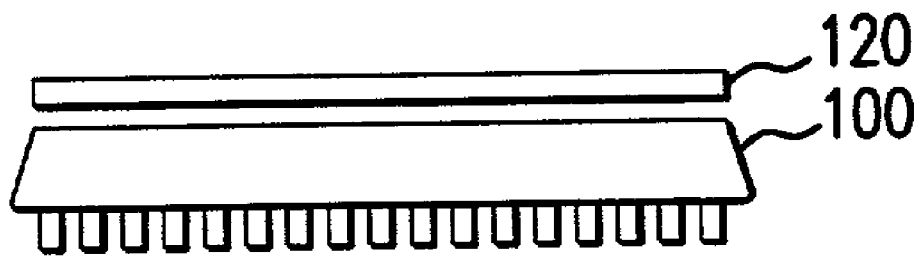
FIG. 5 is a side view schematic of another embodiment of the invention.
Figure 6:
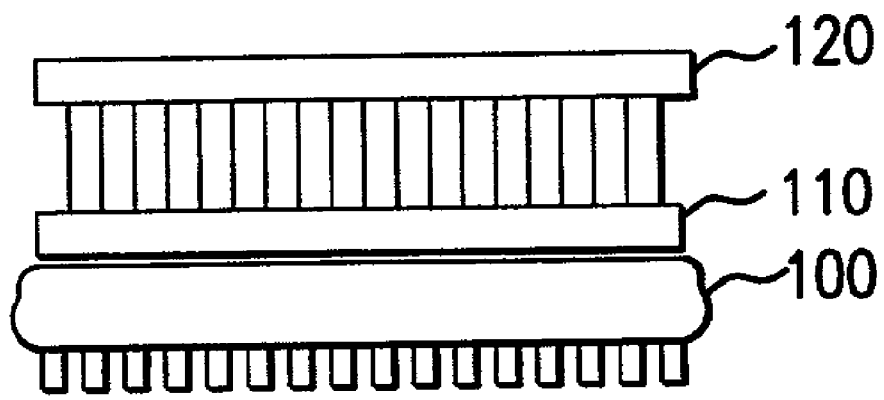
FIG. 6 is a side view schematic of another embodiment of the invention.

Another embodiment of the inventive method is depicted in FIG. 5. One of the biggest sources of RF interference in a network device is a serializing/deserializing chip or SERDE. When SERDEs are run at clock speeds of 1–10 GHz, they can emit RF interference also in the range of 1–10 GHz. In this embodiment of the invention, the foam is applied directly to the RF-emitting components in question. For example, as shown in FIG. 5, foam 120 is being applied directly to the top surface of exemplary chip 100 (which is representative of any component in the system which will emit RF interference). Similarly, as shown in FIG. 6, foam 120 may be applied atop heat sink 110, which is, in turn, applied to integrated circuited chip 100, such as an application specific integrated circuit (ASIC) or a processor. In this manner, the heat generated by the absorption of the RF interference does not affect chip 100 and is drawn off by heat sink 110. These embodiments of the method are particularly advantageous, because they eliminate RF interference at the source of emission, thereby absorbing a much greater percentage of the interference than if it were disposed more remotely, for example, on the door of the chassis. In fact, the disposition of the foam solely on the door of the chassis may not be sufficient to solve the internal interference problem of the device interfering with itself (although it is sufficient to prevent RF interference from leaking out of the device and interfering with other devices, as shown in FIG. 4). Of course, the foam can be placed on both the specific components and the chassis for added RF absorption. In addition or in the alternative, one may place the doped foam near or on the EMI-emitting components within a Faraday cage.

Having described several embodiments of the invention, it is to be understood that the description is not meant as a limitation excluding such further variations or modifications as may be apparent or may suggest themselves to those skilled in the art. It is intended that the present invention cover such variations and modifications as fall within the scope of the claims appearing hereinbelow.

What is claimed is:

1. A low radio frequency emissions network device, comprising:
    a chassis;
    a network device component disposed within said chassis, said network device component emitting electromagnetic interference;
    a layer of foam having a predetermined insertion loss in the frequency range of electromagnetic interference disposed on at least a portion of a surface of said network device, said layer of foam substantially covering an inner surface of said chassis,
    wherein said layer of foam is disposed in proximity to said network device component,
    wherein said layer of foam is approximately 0.25 inches in thickness, absorbs electromagnetic interference, and prevents a predetermined amount of electromagnetic interference from exiting said chassis and interfering with said network device,
    wherein said layer of foam is doped to increase the insertion loss of said layer of foam in the 1–10 GHz range,
    said network device component comprising at least one integrated circuit emitting electromagnetic interference, said at least one integrated circuit having a heat sink, wherein said layer of foam is disposed directly on top of said heat sink; and
    a Faraday cage, wherein said layer of foam is provided outside of said Faraday cage.

2. A low radio frequency emissions network device according to claim 1, wherein the network device component comprises an electronic component.

3. A low radio frequency emissions network device according to claim 2, wherein said electronic component comprises at least one integrated circuit, wherein said layer of foam is provided at least on top of said at least one integrated circuit.

4. A low radio frequency emissions network device according to claim 2, wherein said electronic component comprises at least one integrated circuit running at a clock speed of 1–10 GHz, wherein said layer of foam is provided at least on top of said at least one integrated circuit running at a clock speed of 1–10 GHz.

5. A low radio frequency emissions network device according to claim 1, wherein said network device is a network device operating in the 1–10 GHz range.

6. A low radio frequency emissions network device according to claim 1, wherein said chassis further comprises a door, wherein said layer of foam is provided at least on a portion of said door of said chassis.

7. A low radio frequency emissions network device according to claim 1, wherein said chassis further comprises a door, wherein said layer of foam is provided at least on a portion of said door of said chassis outside said Faraday cage.

8. A low radio frequency emissions network device according to claim 1, wherein said layer of foam is doped with carbon to increase the insertion loss of said layer of foam in the 1–10 GHz range.

9. A low radio frequency emissions network device according to claim 1, wherein said chassis further comprises a door, said layer of foam being disposed in a first location on at least a portion of said door of said chassis,
    wherein said layer of foam in said first location absorbs electromagnetic interference and prevents at least some of the interference from exiting said chassis.

10. A low radio frequency emissions network device according to claim 9, wherein said layer of foam is disposed in a second location in proximity to said electromagnetic-interference-emitting network device component,
    wherein said layer of foam in said second location absorbs electromagnetic interference and prevents at least some of the electromagnetic interference from exiting said chassis and prevents at least some of the electromagnetic interference from interfering with the network device.

11. A low radio frequency emissions network device according to claim 10, wherein said network device component comprises at least one integrated circuit emitting electromagnetic interference, wherein said second location is directly on top of said at least one integrated circuit.

12. A low radio frequency emissions network device according to claim 10, wherein said network device component comprises at least one integrated circuit emitting electromagnetic interference, said at least one integrated circuit comprising said heat sink, wherein said second location is directly on top of said heat sink of said at least one integrated circuit.

13. A low radio frequency emissions network device according to claim 1, wherein said network device component comprises at least one integrated circuit emitting electromagnetic interference, wherein said layer of foam is disposed directly on top of said at least one integrated circuit.

* * * * *